United States Patent
McGrattan et al.

(10) Patent No.: US 7,814,056 B2
(45) Date of Patent: Oct. 12, 2010

(54) METHOD AND APPARATUS FOR DATA BACKUP USING DATA BLOCKS

(75) Inventors: Emma K. McGrattan, Smithtown, NY (US); Stephen Ball, Hauppauge, NY (US); Sami R. Moucaddem, St-Laurent (CA); Jean-Francois Rivet, Laval (CA); Chin L. Kuo, Douglaston, NY (US); Frank H. Yang, Setauket, NY (US)

(73) Assignee: Computer Associates Think, Inc., Islandia, NY (US)

( * ) Notice: Subject to any disclaimer, the term of this patent is extended or adjusted under 35 U.S.C. 154(b) by 537 days.

(21) Appl. No.: 11/331,615

(22) Filed: Jan. 13, 2006

(65) Prior Publication Data

US 2007/0027937 A1    Feb. 1, 2007

Related U.S. Application Data

(63) Continuation of application No. 11/134,084, filed on May 20, 2005, now abandoned.

(60) Provisional application No. 60/573,586, filed on May 21, 2004.

(51) Int. Cl.
*G06F 7/00* (2006.01)
*G06F 17/00* (2006.01)

(52) U.S. Cl. .................. 707/640; 707/644; 707/645; 707/646; 707/674

(58) Field of Classification Search .................. None
See application file for complete search history.

(56) References Cited

U.S. PATENT DOCUMENTS 5,559,991 A * 9/1996 Kanfi .................. 711/162

(Continued)

FOREIGN PATENT DOCUMENTS

EP    0 520 459 A    12/1992

(Continued)

OTHER PUBLICATIONS

Notification of Transmittal of the International Search Report and the Written Opinion of the International Searching Authority for International Application No. PCT/US2005/017855, filed May 20, 2005, (5 pages), Oct. 17, 2005.

(Continued)

*Primary Examiner*—Cam Y Truong
*Assistant Examiner*—Michael Pham
(74) *Attorney, Agent, or Firm*—Baker Botts L.L.P.

(57) ABSTRACT

Methods and apparatuses for backing up data to a database are provided. A specified data set to be backed up is broken down into a plurality of data blocks, each data block is associated with a data block digest, and the data blocks and associated data block digests are stored in the database. When one or more data blocks are subsequently changed, an update to the backup may be performed by adding to the backup data only the data blocks that have changed since the initial backup. Methods and apparatuses for restoring backup data from a database are also provided. Timestamp information associated with the data blocks in the database is used to select the data blocks to be restored.

30 Claims, 5 Drawing Sheets

U.S. PATENT DOCUMENTS

| | | | |
|---|---|---|---|
| 5,765,173 A * | 6/1998 | Cane et al. | 707/204 |
| 5,835,953 A * | 11/1998 | Ohran | 711/162 |
| 5,943,688 A | 8/1999 | Fisher et al. | 711/162 |
| 6,085,298 A * | 7/2000 | Ohran | 711/162 |
| 6,978,280 B1 * | 12/2005 | Cochran et al. | 707/202 |
| 7,152,077 B2 * | 12/2006 | Veitch et al. | 707/203 |
| 7,155,585 B2 * | 12/2006 | Lam et al. | 711/162 |
| 7,454,443 B2 * | 11/2008 | Ram et al. | 707/200 |
| 2003/0074378 A1 * | 4/2003 | Midgley et al. | 707/204 |
| 2003/0200480 A1 | 10/2003 | Beattie | 714/13 |
| 2004/0143713 A1 * | 7/2004 | Niles et al. | 711/162 |

FOREIGN PATENT DOCUMENTS

| | | |
|---|---|---|
| EP | 0 541 281 A | 5/1993 |
| EP | 0 899 662 A1 | 3/1999 |
| EP | 1 353 273 A | 10/2003 |
| WO | WO 99/09480 A | 2/1999 |
| WO | WO 01/65371 A2 | 9/2001 |
| WO | WO 2005/114420 A2 | 12/2005 |

OTHER PUBLICATIONS

PCT, International Search Report and Written Opinion (ISA/EPO) for PCT/US2006/019294, International Filing Date May 18, 2006; 11 pages, Nov. 17, 2006.

European Communication, 5 pages, Aug. 11, 2008.

Communication from the Formalities Officer at the European Patent Office in Germany mailed Nov. 23, 2009 regarding Application No. 08011041 (6 pages).

Communication from the Formalities Officer at the European Patent Office in Germany mailed Apr. 1, 2009 regarding Application No. 08011041.4-2224/1967952.

* cited by examiner

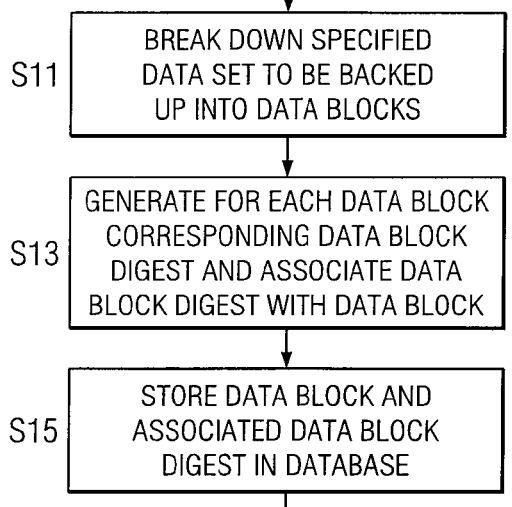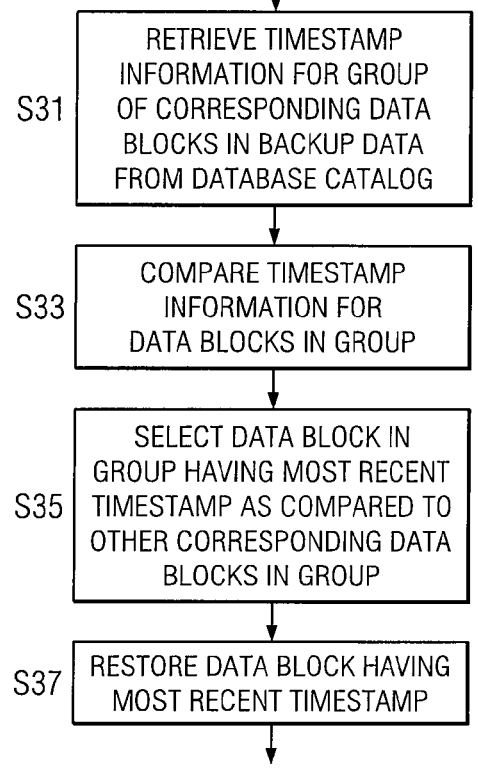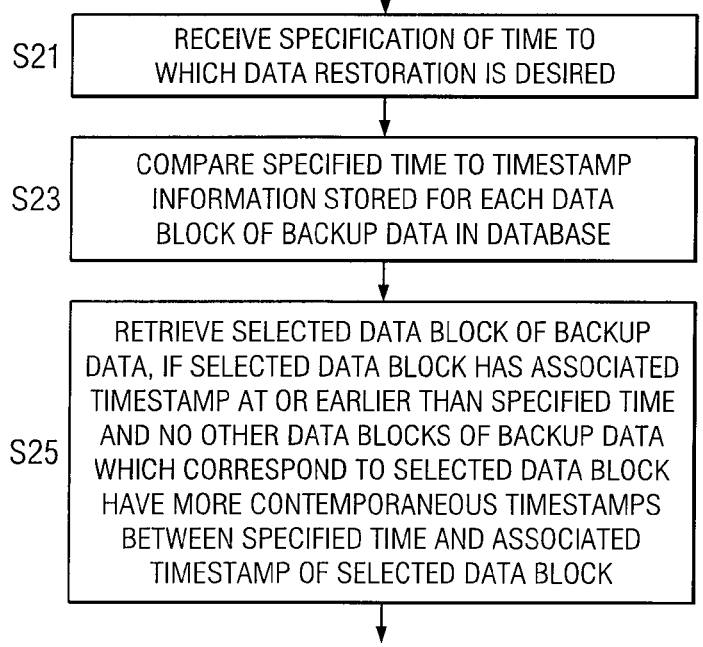

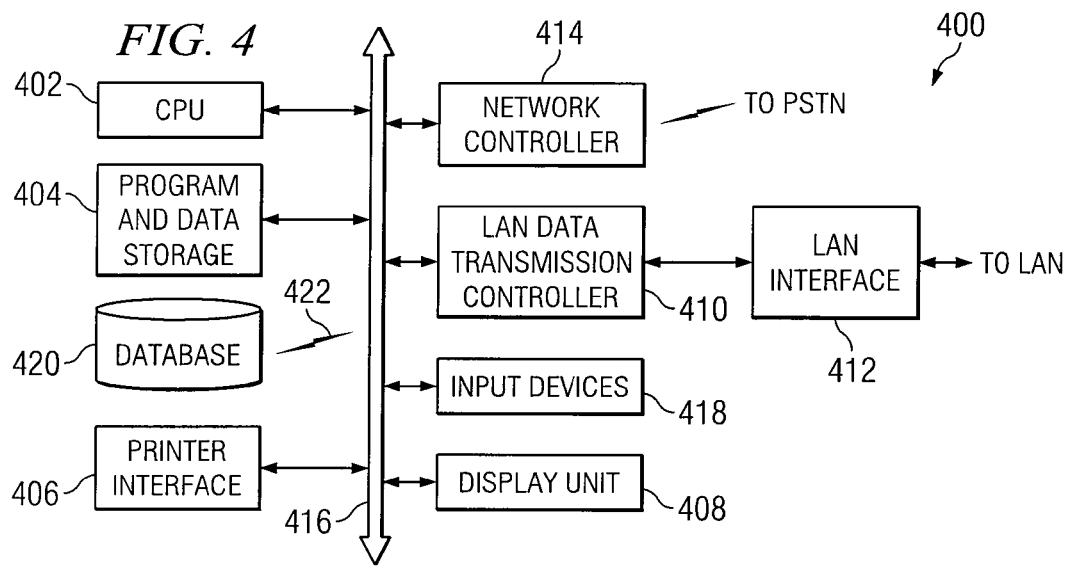

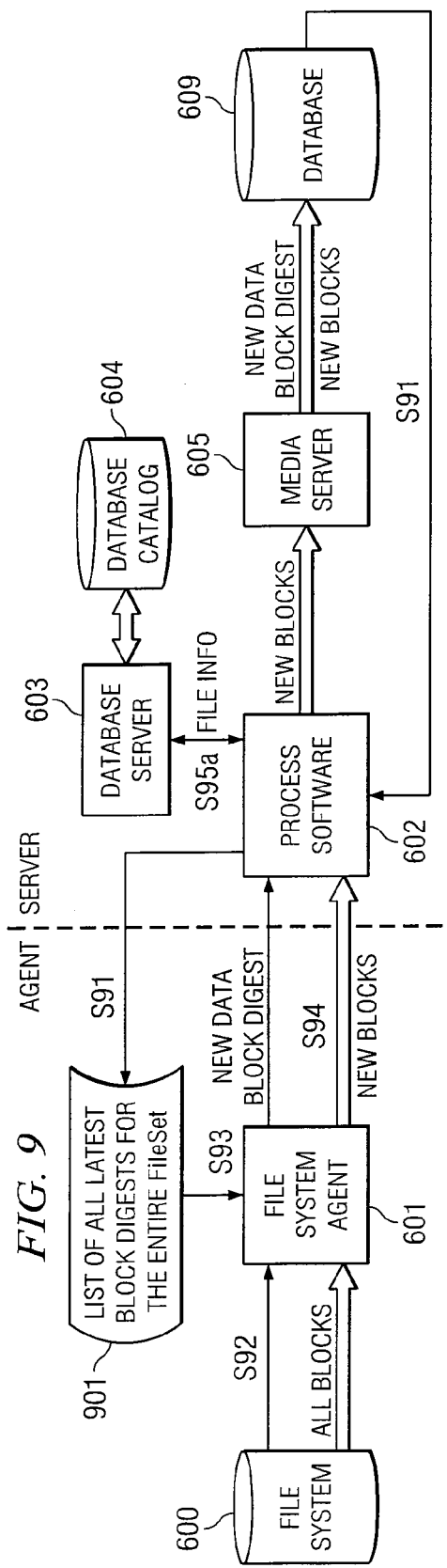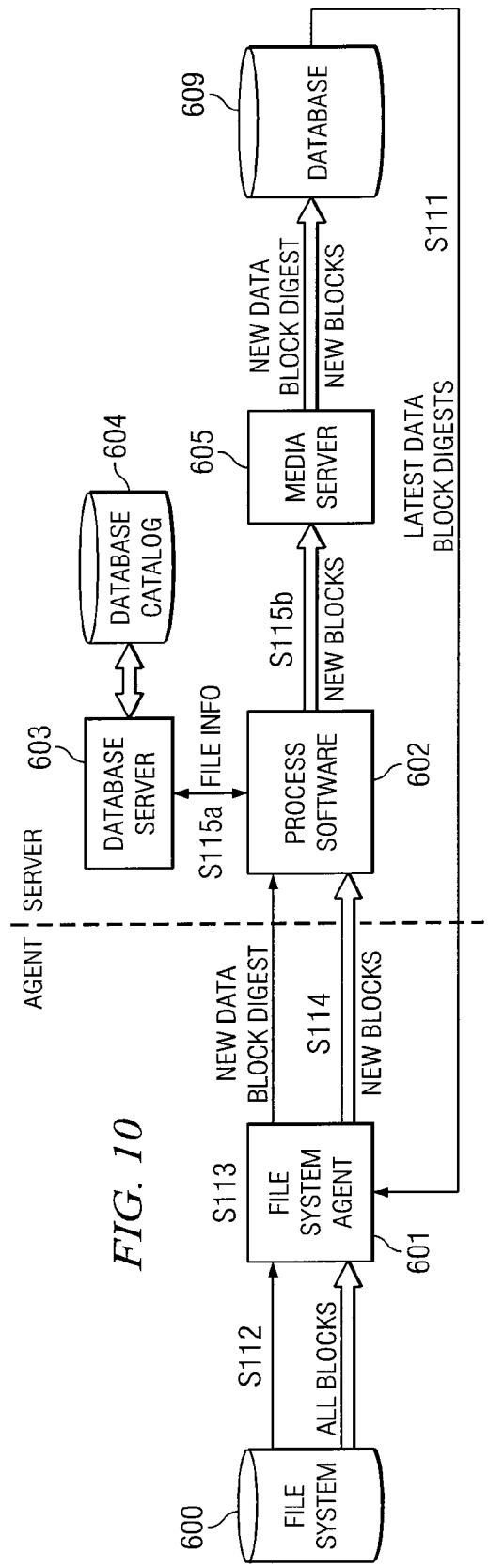

METHOD AND APPARATUS FOR DATA BACKUP USING DATA BLOCKS

CROSS-REFERENCE TO RELATED APPLICATIONS

This application is a continuation of U.S. application Ser. No. 11/134,084, which was filed on May 20, 2005, now abandoned which claims the benefit of U.S. Provisional Application Ser. No. 60/573,586, filed May 21, 2004 and entitled "METHOD AND APPARATUS FOR STORAGE BACKUP."

TECHNICAL FIELD

The present disclosure relates generally to the field of storage backup. More particularly, the present disclosure relates to data storage backup to a database.

DESCRIPTION OF THE RELATED ART

Disasters, such as fires, floods, power outages, terrorist attacks, natural disasters, etc., can severely interrupt the functioning of an organization and cause it to lose money, time and business. Enterprises and individuals who use computers that contain critical data, need disaster recovery plans in place in the event of a disaster, in order to safeguard vital information stored on the computers. Even in non-disaster situations, in which users may just want to archive their information, it is beneficial to implement "backup" and recovery plans.

Typically, users backup their information systems in order to protect the data and information in the system. A backup involves the copying or printing of the contents of a hard disk to another storage medium, often located at a remote location. Complete or partial backups can be performed for archival purposes and/or data recovery in the case of system failure. A complete backup is a full backup of the entire system, including drives, directories and files. A partial backup can be either differential, in which all of the files that were changed since the last complete backup are considered, or incremental, in which all of the files that were changed since the last backup are considered, or user-defined, in which only sets of files specified by a user are considered.

However, these backup methods suffer from various drawbacks. For example, both the complete and incremental methods cause redundant data to be backed up and stored, thereby unnecessarily consuming additional storage space.

Conventionally, data is backed up onto either tapes, CDs, DVDs, or disks. Backup of critical data is typically, periodically or otherwise regularly, performed by streaming the data at a steady high speed rate. Each backup by a conventional system creates a distinct and complete copy of the data, generally without referring to other backups. Therefore, conventional backup systems often cause redundant data to be backed up and stored, thereby unnecessarily consuming additional storage space. Such unnecessary consumption of storage space has associated inefficiencies of time as well as cost. For example, when restoring or recovering data, conventional methodologies consume significant amounts of time. When the backup data to be accessed is stored, for example, on tape, data on the backup tape is read and processed sequentially, a process that takes a relatively long time depending on the number of tapes and the amount of data that is being restored.

Furthermore, conventional methodologies do not always provide comprehensive data protection. For example, using a tape backup (for example, DAT tapes) often provides computer users with a false sense of protection because tape drives may fall out of alignment, especially when the data backups are frequent. In other words, the recording track changes positions when it writes to the tape, requiring users to continuously check the condition of the tape drive, a process that not all users remember or even have the time to do. In addition to the problem of alignment, tapes suffer from additional problems in that they can become damaged, corrupted, or even accidentally or intentionally overwritten.

Ideally, data should be backed up frequently and restored rapidly from backup after a system failure. However, as the amount of information increases, it becomes more difficult to maintain the frequency of data backups and promptly restore the data from a particular point in time after a system failure, if conventional methods are used.

Accordingly, a need exists for techniques that overcome the disadvantages of conventional data storage techniques. It would be beneficial to have methods and systems for optimum backup of data and timely and efficient restoration of backup data.

SUMMARY

A method for backing up data, according to one embodiment, includes breaking down a specified data set to be backed up into a plurality of data blocks, generating for each data block a corresponding data block digest and associating the data block digest with the data block, and storing the data block and the associated generated data block digest in a database.

A method for restoring backup data from a database, with the backup data being stored in the database as a plurality of data blocks, according to one embodiment, includes receiving specification of a time to which data restoration is desired, comparing the specified time to timestamp information stored for each data block of the backup data in the database, and retrieving a selected data block of the backup data, if the selected data block has an associated timestamp at or earlier than the specified time and no other data blocks of the backup data which correspond to the selected data block have more contemporaneous timestamps between the specified time and the associated timestamp of the selected data block.

A method for restoring backup data from a database, according to another embodiment, includes retrieving timestamp information for a group of corresponding data blocks in the backup data from a database catalog, comparing the timestamp information for the data blocks in the group, selecting a data block in the group having the most recent timestamp as compared to the other corresponding data blocks in the group, and restoring the data block having the most recent timestamp.

An apparatus for backing up data to a database, according to one embodiment, includes means for breaking down a specified data set to be backed up into a plurality of data blocks, means for generating for each data block a corresponding data block digest and associating the data block digest with the data block, and means for storing the data block and the associated generated data block digest in a database.

An apparatus for restoring backup data from a database, with the backup data being stored in the database as a plurality of data blocks, according to one embodiment, includes means for receiving specification of a time to which data restoration is desired, means for comparing the specified time to timestamp information stored for each data block of the backup data in the database, and means for retrieving a selected data block of the backup data, if the selected data block has an associated timestamp at or earlier than the specified time and no other data blocks of the backup data which correspond to the selected data block have more contemporaneous timestamps between the specified time and the associated timestamp of the selected data block.

An apparatus for restoring backup data from a database, according to another embodiment, includes means for retrieving timestamp information for a group of corresponding data blocks in the backup data from a database catalog, means for comparing the timestamp information for the data blocks in the group, means for selecting a data block in the group having the most recent timestamp as compared to the other corresponding data blocks in the group, and means for restoring the data block having the most recent timestamp.

BRIEF DESCRIPTION OF THE DRAWINGS

The features of the present application can be more readily understood from the following detailed description with reference to the accompanying drawings wherein:

FIG. 1 shows a flow chart of a method for backing up data to a database, according to one embodiment of the present application;

FIG. 2 shows a flow chart of a method, according to one embodiment of the present application, for restoring backup data from a database;

FIG. 3 shows a flow chart of a method for restoring backup data from a database, according to another embodiment of the present application.

FIG. 4 shows a block diagram of an exemplary computer system capable of implementing the methods and apparatuses of the present application;

FIGS. 5A-5C show schematic diagrams illustrating the technique of breaking down a specified data set to be backed up into a plurality of data blocks and generating and assigning for each of the data blocks an associated data block digest, according to one exemplary embodiment of the present application.

FIG. 9 shows a schematic diagram illustrating operations by which only changed data blocks are saved in a backup, according to one embodiment of the present application; and FIG. 10 shows a schematic diagram illustrating operations by which only changed data blocks are saved in a backup, according to an alternate embodiment of the present application.

DETAILED DESCRIPTION

Figure 5C:
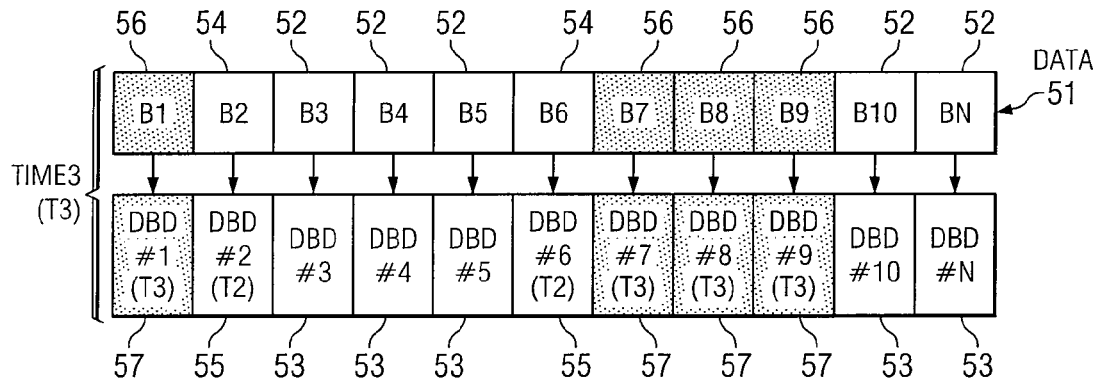

This application provides tools (in the form of methodologies, apparatuses, and systems) for backing up data to a database and/or for restoring backup data from a database. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the invention as set forth in the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

A method for backing up data, according to one embodiment, will be described with reference to FIG. 1. A specified data set is broken down into a plurality of data blocks (Step S11). For each of the data blocks, a corresponding data block digest is generated and associated with the data block (Step S13). The data block and the associated data block digest are stored in a database (Step S15). The data blocks may have a fixed size and typically are stored in the database with associated timestamp information.

A backup refresh of the specified data set can be performed after the data set has been backed up. In a refresh operation, a new data block digest of a selected data block in the specified data set to be refreshed is determined and then compared with the stored data block digest of the associated data block in the database which corresponds to the selected data block. The selected data block and the new data block digest in the database are backed up if the new data block digest of the selected data block does not equal the stored data block digest of the associated data block in the database (that is, the content of the data block changed). If the selected data block is backed up in the database, the selected data block replaces the associated data block in the database as a current version of the data block.

The data to be backed up can optionally be pre-selected by a user and arranged into an object set. The object set (or any other entity including data, such as, a fileset, datastream, e-mail, database, etc.) may be is referenced by a set identifier and can contain a plurality of data objects. Each data object typically has an associated object identifier and an object name. For each instance of a data object, object identifier and timestamp information are stored as metadata in a database catalog and attribute information is stored in the database. Furthermore, for each data object, an object map is generated which can include object identifier, timestamp, data block number, block identifier and data block digest information. The data block digest and the data block number information can be stored in the database, and the object identifier, timestamp and block identifier information may be stored as metadata in a database catalog.

When requested, a data object can be deleted. When a data object is requested to be deleted, the data object is flagged as deleted in the database catalog, and the data blocks of the data object and object maps corresponding to the data object remain in the database until requested to be permanently deleted.

The method for backing up data can also include comparing the generated data block digest for a selected data block in the specified data set to be backed up on the one hand, and on the other hand, data block digests of backed up data blocks stored in the database, to determine whether the selected data block is already backed up. If the generated data block digest is not equal to any of the data block digests of the backed up data blocks stored in the database (that is, the data block has not already been backed up), then the selected data block and the generated data block digest are stored in the database.

A secondary backup of the specified data set can optionally be performed to a secondary backup medium after the data set has been backed up.

A method for restoring backup data from a database, according to one embodiment, will be described with reference to FIG. 2. The backup data is stored in the database as a plurality of data blocks. Each data block is typically stored with associated timestamp information in the database. A specification of a time to which data restoration is desired is received (step S21). The specified time is compared to timestamp information stored (step S23) for each of the data blocks of the backup data in the database. A selected data block of the backup data is retrieved if the selected data block has a timestamp at or earlier than the specified time and no other data blocks of the backup data which correspond to the selected data block have more contemporaneous timestamps between the specified time and the associated timestamp of the selected data block (step S25). The backup data is typically retrieved from the database and the stored timestamp information can be stored in a database catalog. A backup of the restored backup data can be performed to a secondary backup medium.

A method for restoring backup data from a database according to another embodiment, will be described with reference to FIG. 3. The backup data is stored in the database as a plurality of data blocks. Timestamp information for a group of corresponding data blocks in the backup data is retrieved from a database catalog (step S31). The timestamp information for the data blocks in the group is compared (step S33) and a data block in the group having the most recent timestamp as compared to other corresponding data blocks in the group is selected (step S35). The data block having the most recent timestamp is restored (step S37). Each of the data blocks with the most recent timestamp can be grouped by object set and each data block within each object set can be ordered by block number.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

For example, FIG. 4 shows an example of a computer system 400 which may implement the methods and apparatuses of the present disclosure. The methods and apparatuses of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 400 can include a central processing unit (CPU) 402, program and data storage devices 404, a printer interface 406, a display unit 408, a (LAN) local area network data transmission controller 410, a LAN interface 412, a network controller 414, an internal bus 416, and one or more input devices 418 (for example, a keyboard, mouse etc.). As shown, the system 400 may be connected to a database 420, via a link 422.

In general, databases allow for easy integration and manipulation of data. A database typically includes information known as "metadata" which describes (for example, the structure or other characteristics of) associated data in the database. This metadata (for example, timestamp information) is stored in data tables that are similar to (but typically separate from) the data tables that hold the associated data.

The problems encountered by conventional backup systems and methodologies can be avoided through the methods and apparatuses of the present application, more specifically, through backup to a database ("BTD") as a repository for the data (instead of media such as, CDs, DVDs, disks, tapes, etc.). BTD technology performs backup of data to a database, and the stored data includes metadata which describes the backup data. The database preferably is of high performance and contains enough capacity to store all of the data to be backed up.

The utilization of a database for backup allows for storage optimization by storing only one copy of each unique data block in the database. When the content of a data block changes, the backup can be updated with a new instance of the data block. Thus, a data block may have multiple, associated instances in the backup data. Each instance of a data block has an associated data block digest. The data block digest corresponds to the data content of the data block instance, and is substantially unique to that data content. Before a new instance of a data block is stored in the database, the unique data block digest of the data block instance is compared to the data block digest of any instances of the data block already stored in the database, to determine any redundancies.

A data block instance has associated metadata, including timestamp information as an additional dimension to the data. The timestamp information identifies the data and time of creation and/or modification associated with the data block instance and allows the system to distinguish between older and more recent instances of a data block. The timestamp information can be used for reconstruction or recovery of virtual point-in-time copies of the data, for example, for data analysis.

Furthermore, the speed of data recovery is facilitated by the indexing feature of the database, a characteristic which is not present in conventional backup systems or media.

Data to be backed up is broken down into block level increments which are suitable for backup to a database and then stored. There are many advantages to storing, and referring, to the data on a block level, including the ability, when the stored data is corrupted in part, to step incrementally through uncorrupted data blocks up to the corrupted data block. Use of a database as a repository for backup data coupled with a time stamping feature for the data on a data block level facilitates novel backup methodologies which use block level incremental backup and recovery.

One of the steps in the BTD process is to convert the data in a specified data set to be backed up into a plurality of data blocks, and generate and assign to a data block an associated data block digest, according to the data content of the block. If a block in the data to be backed up ("candidate block") is identical to a corresponding backed up data block, the candidate block has the same data block digest as the corresponding data block to which it is identical, and the BTD system does not store the candidate block in the database. Instead, the metadata for the corresponding backed up data block is updated, including adding a timestamp associated with the candidate block, to reflect the fact that the backed up data block is identical to the later candidate block.

If the candidate block is different from the corresponding backed up block, the newly generated data block digest is assigned to the candidate block and the candidate block is stored, with timestamp, as an additional instance of the backed up data block in the database. For example, during an initial backup, data block XYZ may be assigned data block digest "dXYZ" based on the data contained in the data block. However, if during a subsequent backup a candidate block ABC corresponding to data block XYZ is not identical to data block XYZ, the newly generated data block digest "dABC" is assigned to data block ABC, and ABC is associated with block XYZ as an additional instance of the data block.

Schematic diagrams illustrating breaking down a specified data set to be backed up into a plurality of data blocks and generating and assigning for each of the data blocks an associated data block digest, according to an exemplary embodiment, are shown in FIGS. 5A-5C. At time #1 (FIG. 5A), a "remember" operation is performed. Data 51 at instance 52 is broken down into a plurality of data blocks B1, B2, . . . BN. Data block digests 53 are generated for the data blocks B1, B2, . . . BN at instance 52 and assigned to the data blocks. Thus, data block digests DBD#1, DBD#2, . . . . DBD#N are associated with blocks B1, B2, . . . BN, respectively. The data blocks and the data block digests are stored in the database.

Time #2 illustrates the creation of new instances of a data block. At time #2 (FIG. 5B), a "refresh" operation is performed. The backup of data 51 is updated with changes occurring in blocks B2, B6, and B7 at instance 54. Therefore, new data block digests DBD#2 (T2), DBD#6 (T2) and DBD#7 (T2) are generated and assigned for the modified data blocks instance 54, while the data block digests for the unmodified data blocks at instance 52 remain the same. In this situation, only the modified data block instances 54 and their respective data block digests are added to the backup in the database.

At time #3 (FIG. 5C), an additional refresh operation is performed. The backup of data 51 is updated again, with changes occurring in data blocks B1, B7, B8 and B9 at instance 56. Here, new data block digests DBD#1 (T3), DBD#7 (T3), DBD#8 (T3) and DBD#9 (T3) are generated and assigned for the recently modified data block instances 56 of blocks B1, B7, B8 and B9, while the data block digests DBD#3, DBD#4, DBD#5, DBD#10 and DBD#N for the original unmodified data blocks B3, B4, B6, B10 and BN and the data block digests DBD#2 (T2) and DBD#6 (T2) for the modified data blocks B2 and B6 at instance 54 at time#2 remain the same. Thus, at time#3, only the data block digests DBD#1 (T3), DBD#7 (T3), DBD#8 (T3) and DBD#9 (T3) and the modified data blocks B1, B7, B8 and B9 at instance 56 are stored in the database.

Unique data block digests can be generated in accordance with a number of existing methods and technologies, such as one-way hashing techniques (for example, BOB ID, MD4, MD5, Haval, SHA-1, block ciphers, etc.).

Each data block instance is associated with timestamp information (including date and time), to keep track of when the data block was created and/or last modified. The availability of timestamp information for each backed up data block instance allows for point in time recovery (rapid recovery).

For example, if a user wants to know what the data looked like at a specific point in time prior to the present version, the user can "flashback" the object to that specific point in time. In other words, the user can query the database regarding the specific point in time, and in response the system rewinds itself to a point in time in the past (by comparing timestamp information to the specific point in time), and retrieve (and, more specifically, reconstruct by using timestamp information) the requested older data.

Figure 6:
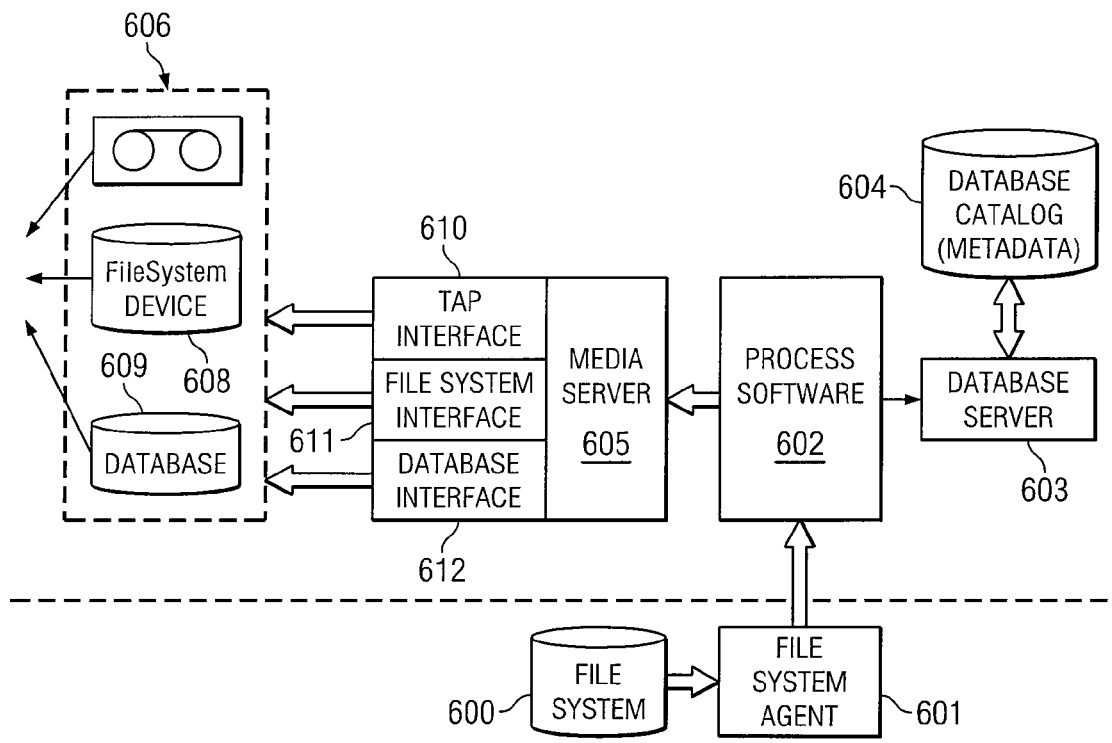
FIG. 6 shows a block diagram illustrating a system for backing up data to a database, according to one embodiment of the present application.

FIG. 6 is a schematic diagram illustrating a system for backing up data to a database according to an embodiment of the present application. Object system 600 contains the objects to be backed up. A user can pre-select a set of objects to be backed up collectively. All such selected objects are stored together in an object set which is referenced by a set identifier. Each selected object in the object set also has an associated object identifier and an object name.

Object system agent 601 generates and assigns data block digests for the data blocks from each of the objects to be backed up and sends both the data blocks and the data block digests to process software 602 for further processing corresponding to a requested operation. The supported operations can include, for example, "remember object", "refresh object", "flashback object", "forget object", etc. In "remember object" operations, all the data blocks are stored in the database (e.g., full backup). In "refresh object" operations, only the changed or updated data blocks are stored in the database (e.g., incremental backup). In certain embodiments, the "remember object" and "refresh object" operations are the same operation. In "flashback object" operations, saved data blocks are retrieved from the database based on the timestamp information. In "forget object" operations, a specified object that is no longer required is marked as deleted.

For example, if the requested operation is "remember object", object maps are created for all of the objects in the object set. An object map includes object identifier, timestamp information, and unique block ID. This information is sent to database server 603 to be stored in database catalog 604. In addition, the data blocks and the generated data block digests are sent to media server 605 to be stored in database 609.

The media server 605 provides interfaces for different device and media classes, depending on the attached storage devices/media 606, which include database 609. An additional feature that is provided with the BTD technology is use of conventional backup media, for example, tape, CD, DVD, disk, etc., or other media components for a secondary backup ("synthetic backup") after backup to the database. This feature may be used for archiving purposes, such as to store particular data for long term purposes, as a supplement to short term access to the stored data in the database. Additional attached storage devices/media 607, 608 allow for these synthetic backups to be performed. By utilizing the ability of database 609 to randomly retrieve data blocks, a backup image is created through the extraction of data blocks based on their timestamp. For example, under some circumstances, the data blocks with the highest timestamps can be retrieved, grouped by their object set, and ordered by block number. The media server 605 receives this information and reads out the listed blocks, forwarding those blocks to the appropriate device/media interface 610, 611, 612. The device/media interface then sends the information to associated device/media 607, 608 for synthetic backup.

Figure 7:
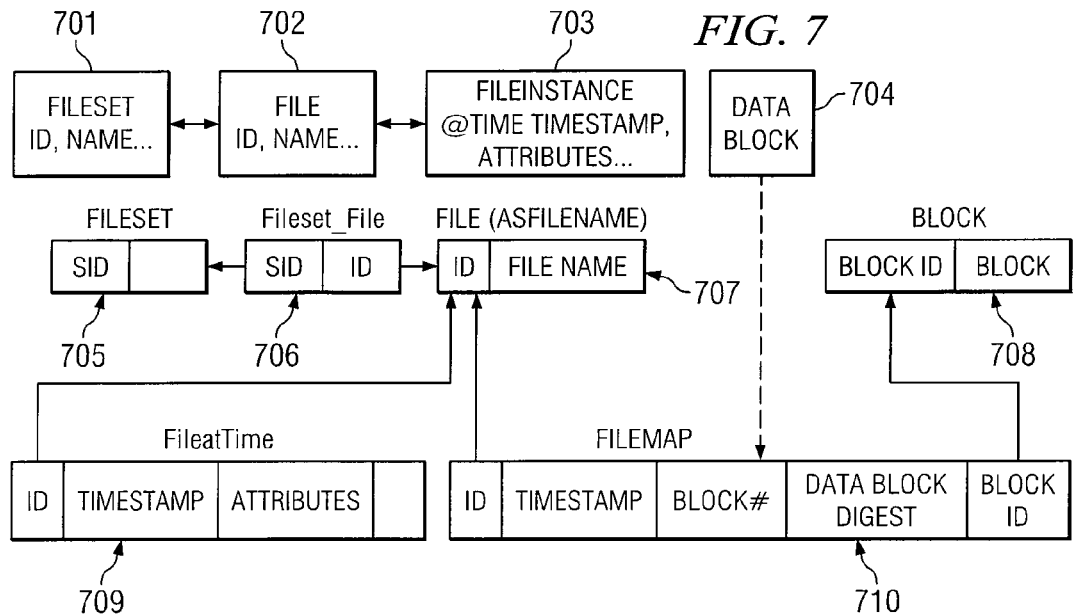
FIG. 7 shows a schematic diagram illustrating the data format of metadata associated with a data block instance which is stored in a database catalog, according to one embodiment of the present application.

Database server 603 can provide a client interface for database catalog (metadata) 604. The metadata associated with each data block instance (such as timestamp and attribute information) is stored in database catalog 604 in a format such as illustrated exemplarily in FIG. 7. Object set 701 (e.g., pre-selected objects for backup) is referenced by an identifier and the objects in object set 702 are referenced by a name and identifier. As explained above, storing redundant data that is already backed up and has not changed unnecessarily consumes valuable storage and is time consuming. Referring to the timestamps of data blocks in the backed up data helps to expedite the (point in time) recovery process. Thus, for every given object instance (data instance), there is an associated timestamp and attribute information 703. Each object also has an object map that includes the following fields: an object identifier; timestamp; block number; data block digest; and block ID 710.

Figure 8:
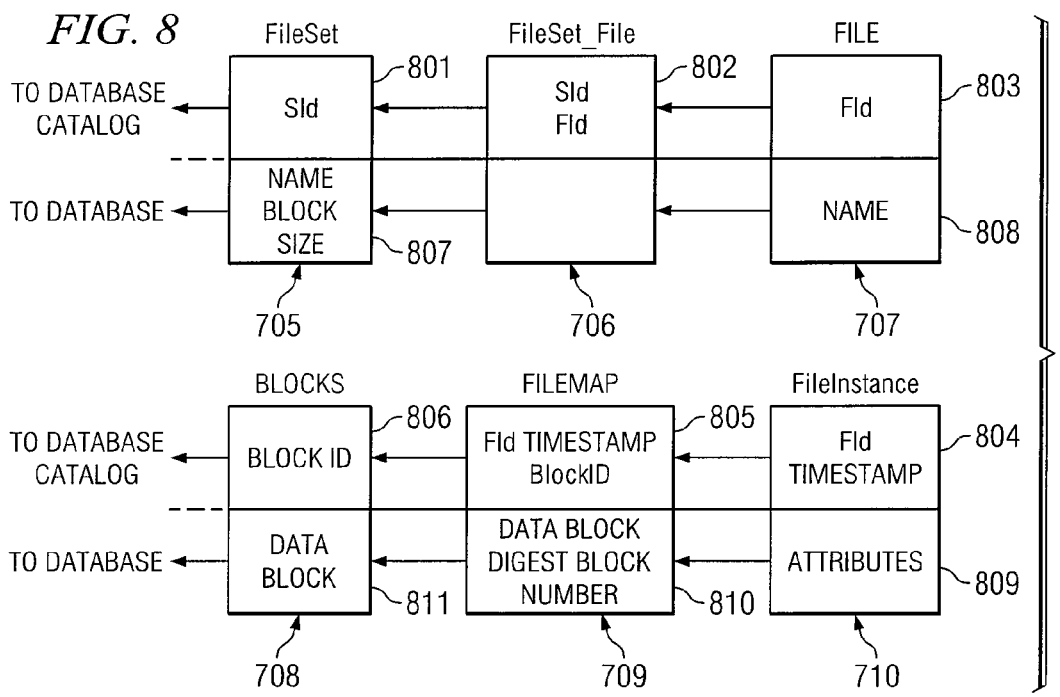
FIG. 8 shows a schematic diagram illustrating entries stored in a database catalog and entries stored in a database, according to one embodiment of the present application.

FIG. 8 is a schematic diagram illustrating entries which are stored in database catalog 604 and entries which are stored in database 609. The items 801, 802, 803, 804, 805, and 806 in the top row corresponding to objects 705, 706, 707, 708, 709, and 710 are stored in database catalog 604. In contrast, the items 807, 808, 809, 810, and 811 in the bottom row are stored in database 609.

FIG. 9 shows a schematic diagram illustrating operations by which only the changed data blocks are saved in a backup, according to one embodiment of the present application. When a request for the operation "refresh object" is received, process software 602 collects the latest timestamps associated with the objects in the specified object set and correlates them to the data block digests for each data block in each of the objects of the object set (step S1). A list of the data block digests for the entire specified object set 901 is compiled and sorted in order of an object system directories walk-through (for example, data block digests are collected block-by-block for each object in the object set, and the collected data block digests are sorted) and is then sent to object system agent 601 (step S91). Object attributes are then read from Object system 600 for the object to be "refreshed" (step S92). The modification date of the object to be "refreshed" is compared to the timestamp information for the stored objects. If the modification date is higher than the latest timestamp for the object, then the object is read (step S92). For every block of size n in the object, a new data block digest is generated and compared against the ones in the list received by object system agent 601 at step 91 (step S93). If the data block digests are not equivalent, then the data block and the generated data block digest are both sent to process software 602 (step S94). If the data block digests are equivalent, then the data block is dropped and the system proceeds to the next block (step S94). Once process software 602 receives the new data blocks, it sends the metadata for the data blocks to database server 603 to be cataloged in database catalog 604 (step S95b) and the data block and data block digest are forwarded to media server 605 to be stored in database 609 (step S95b).

FIG. 10 is a schematic diagram illustrating operations by which only the changed data blocks are saved in a backup, according to an alternate embodiment of the present application. When a request for the operation "refresh object" is received, object system agent connects to database 609 and queries database 609 for the latest data block digests for the data blocks of a given object (step S111). Object attributes are then read from object system 600 for the object to be "refreshed" (step S112). The modification date of the object to be "refreshed" is compared to the timestamp information for the stored objects. If the modification date is higher than the latest timestamp for the object, then the object is read (step S112). For every block of size n in the object, a new block digest is generated and compared against the ones obtained from database 609 at step 111 (step S113). If the data block digests are not equivalent, then the data block and the generated data block digest are both sent to process software 602 (step S114). If the data block digests are equivalent, then the data block is dropped and the system proceeds to the next block (step S114). Once process software 602 receives the new data blocks, it sends the metadata for the data blocks to database server 603 to be cataloged in database catalog 604 (step S115b) and the data block and data block digest are forwarded to media server 605 to be stored in database 609 (step S115b).

The BTD technology provides a "forget object" feature. If an object that was previously stored ("remembered") is physically deleted from the object system, the object is only flagged as deleted in the database catalog. The object maps and data blocks in the database are not deleted because the user might want to "flashback" to a time prior to object deletion.

The BTD technology is also particularly useful for multi-user networks, wherein data is shared between users. Under such circumstances, the database, as described above, stores only one copy of each data block instance, and each user accesses the data block instance by indexing the stored data block instance, and references to the data block instance by multiple users can be tracked through the metadata. For example, if two users, "user#1" and "user#2" each have access to an object (for example, "object A"), and object A is broken down into data blocks (for example, "data blocks XYZ"), only one copy of data blocks XYZ is stored in the database. However, user#1 and user#2 can simultaneously access data blocks XYZ through indexing the data blocks. In addition, the metadata for data blocks XYZ can identify user#1 and user#2 as users who are accessing data blocks XYZ and indicate the times user#1 and user#2 accessed the data blocks XYZ.

The indexing feature of the database also facilitates object navigation, such as searching through the data for particular information or object. For example, if a user wants to find all of the "mp3" files in the backed up data, he or she can query the database to trigger a simple search through the attribute information (metadata) for "mp3" files. Object navigation is not only limited to structured data, such as data typically found in a relational database, but can also be performed with unstructured data, such as the text of a Word document.

Numerous additional modifications and variations of the present disclosure are possible in view of the above-teachings. It is therefore to be understood that within the scope of the appended claims, the present disclosure may be practiced other than as specifically described herein.

Additional variations may be apparent to one of ordinary skill in the art from reading U.S. provisional application Ser. No. 60/573,586, filed May 21, 2004 and entitled "METHOD AND APPARATUS FOR STORAGE BACKUP", the entire contents of which are incorporated herein by reference.

What is claimed is:

1. A method for backing up data, comprising:
at a first computer:
breaking down a specified data set to be backed up into a plurality of data blocks;
generating for each data block a corresponding data block digest and associated metadata comprising data block information; and
associating each data block digest and associated metadata with the corresponding data block; and
comparing a first generated data block digest for a selected data block in the specified data set to be backed up with data block digests stored in a remote database storage device and associated with backed up data blocks stored in the remote database storage device to determine whether the selected data block is already backed up;
upon determining that the first generated data block digest is not equal to any of the data block digests of the backed up data blocks stored in the remote database storage device, storing the selected data block, the associated first generated data block digest, and the associated metadata in the remote database storage device, wherein storing the associated metadata comprises storing in the remote database storage device at least one timestamp associated with the selected data block in the specified data set to be backed up; and
upon determining that the first generated data block digest is equal to one of the data block digests of the backed up data blocks stored in the remote database storage device, updating metadata associated with the data block already stored in the remote database storage device with the generated metadata, wherein updating metadata associated with the data block already stored in the remote database storage device with the generated metadata comprises updating the at least one timestamp associated with the data block already stored in the remote database storage device with the generated metadata.

2. The method of claim 1, further comprising refreshing backup of the specified data set after the data set has been backed up.

3. The method of claim 2, wherein the refreshing backup of the specified data set includes determining a new data block digest of the selected data block in the specified data set to be refreshed, comparing the new data block digest of the selected data block to the stored data block digest of the associated data block in the remote database storage device which corresponds to the selected data block, and backing up the selected data block and new data block digest in the remote database storage device if the new data block digest of the selected data block does not equal the stored data block digest of the associated data block in the remote database storage device.

4. The method of claim 3, wherein if the selected data block in the specified data set is backed up in the remote database storage device, the selected data block replaces the associated data block in the remote database storage device as a current version of the data block.

5. The method of claim 1, wherein the data blocks have a fixed size per object set.

6. The method of claim 1, wherein the data to be backed up is pre-selected by a user and arranged into an object set.

7. The method of claim 6, wherein the object set is referenced by a set identifier.

8. The method of claim 6, wherein the object set comprises a plurality of data objects.

9. The method of claim 8, wherein each data object has an associated object identifier and object name.

10. The method of claim 8, wherein an object instance of a data object includes an object identifier, timestamp and attribute information.

11. The method of claim 10, wherein the attribute information of the object instance is stored in the remote database storage device.

12. The method of claim 10, wherein the object identifier and the timestamp of the object instance are stored as metadata in a database catalog.

13. The method of claim 8, wherein an object map is generated for a data object, and the object map includes object identifier, timestamp, data block number, block identifier and data block digest information.

14. The method of claim 13, wherein the data block digest information and the data block number information are stored in the remote database storage device.

15. The method of claim 13, wherein the object identifier information, timestamp and block identifier information are stored as metadata in a database catalog.

16. A computer system comprising:
a remote database storage device comprising a non-transitory storage medium; and
a processor coupled to the remote database storage device and configured to:
break down a specified data set to be backed up into a plurality of data blocks;
generate for each data block a corresponding data block digest and associated metadata comprising data block information;
associate each data block digest and associated metadata with the corresponding data block; and
compare a first generated data block digest for a selected data block in the specified data set to be backed up with data block digests stored in the remote database storage device and associated with backed up data blocks stored in the remote database storage device to determine whether the selected data block is already backed up; and
an interface coupled to the central processing unit (CPU) and configured to transmit the data block, the associated first generated data block digest, and the associated metadata to the remote database storage device, wherein:
upon determining that the first generated data block is not equal to any of the data block digests of the backed up data blocks stored in the remote database storage device, the remote database storage device is configured to store therein the data block, the associated first generated data block digest, and the associated metadata, wherein the associated metadata comprises at least one timestamp associated with the selected data block in the specified data set to be backed up; and
upon determining that the first generated data block digest is equal to one of the data block digests of the backed up data blocks stored in the remote database storage device, the remote database storage device is configured to update metadata associated with the data block already stored in the remote database storage device with the generated metadata, wherein updating metadata associated with the data block already stored in the remote database storage device with the generated metadata comprises updating the at least one timestamp associated with the data block already stored in the remote database storage device with the generated metadata.

17. A non-transitory storage medium readable by a machine and tangibly embodying a program of instructions executable by the machine, when executed the program of instructions configured to:
at a first computer:
break down a specified data set to be backed up into a plurality of data blocks;
generate for each data block a corresponding data block digest and associated metadata comprising data block information; and
associate each data block digest and associated metadata with the corresponding data block; and
compare a first generated data block digest for a selected data block in the specified data set to be backed up with data block digests stored in a remote database storage device and associated with backed up data blocks stored in the remote database storage device to determine whether the selected data block is already backed up;
upon determining that the first generated data block digest is not equal to any of the data block digests of the backed up data blocks stored in the remote database storage device, store the data block, the associated first generated data block digest, and the associated metadata in the remote database storage device, wherein storing the associated metadata comprises storing in the remote database storage device at least one timestamp associated with the selected data block in the specified data set to be backed up; and
upon determining that the first generated data block digest is equal to one of the data block digests of the backed up data blocks stored in the remote database storage device, update metadata associated with the data block already stored in the remote database storage device with the generated metadata, wherein updating metadata associated with the data block already stored in the remote database storage device with the generated metadata comprises updating the at least one timestamp associated with the data block already stored in the remote database storage device with the generated metadata.

18. The method of claim 13, further comprising deleting a data object when requested, wherein the data object is flagged as deleted in a database catalog, and data blocks and the object map corresponding to the data object remain in the remote database storage device until requested to be permanently deleted.

19. The method of claim 1, further comprising updating a backup of the specified data set after the data set has been backed up.

20. The method of claim 1, further comprising:
receiving specification of a time to which data restoration is desired;
comparing the specified time to the at least one timestamp stored for each data block of the backup data in the remote database storage device; and
retrieving a stored data block of the backup data, if the stored data block has an associated timestamp at or earlier than the specified time and no other data blocks of the backup data which correspond to the stored data block have more contemporaneous timestamps between the specified time and the associated timestamp of the stored data block.

21. The method of claim 20, wherein the at least one timestamp is retrieved from a database catalog.

22. The method of claim 20, wherein the backup data is retrieved from the remote database storage device.

23. The method of claim 20, further comprising backing up the restored backup data to a secondary backup medium.

24. The method of claim 1, further comprising:
retrieving the at least one timestamp for a group of corresponding data blocks in the backup data from a database catalog;
comparing the at least one timestamp for the data blocks in the group;
selecting a recent data block in the group having the most recent timestamp as compared to the other corresponding data blocks in the group; and
restoring the recent data block having the most recent timestamp.

25. The method of claim 24, further comprising, grouping each of the data blocks with the most recent timestamp by object set, and ordering each data block within each object set by block number.

26. The computer system of claim 16, wherein the processor is further configured to:
receive specification of a time to which data restoration is desired; and
compare the specified time to the at least one timestamp stored for each data block of the backup data in the remote database storage device; and
retrieve a stored data block of the backup data, if the stored data block has an associated timestamp at or earlier than the specified time and no other data blocks of the backup data which correspond to the stored data block have more contemporaneous timestamps between the specified time and the associated timestamp of the stored data block.

27. The computer system of claim 16, wherein the processor is further configured to:
retrieve the at least one timestamp for a group of corresponding data blocks in the backup data from a database catalog;
compare the at least one timestamp for the data blocks in the group;
select a recent data block in the group having the most recent timestamp as compared to the other corresponding data blocks in the group; and
restore the recent data block having the most recent timestamp.

28. The program storage device of claim 17, wherein the instructions further configured to:
receive specification of a time to which data restoration is desired;
compare the specified time to the at least one timestamp stored for each data block of the backup data in the remote database storage device; and
retrieve a stored data block of the backup data, if the stored data block has an associated timestamp at or earlier than the specified time and no other data blocks of the backup data which correspond to the stored data block have more contemporaneous timestamps between the specified time and the associated timestamp of the selected data block.

29. The non-transitory storage medium of claim 17, wherein the instructions further configured to:
retrieve the at least one timestamp for a group of corresponding data blocks in the backup data from a database catalog;
compare the at least one timestamp for the data blocks in the group;
select a recent data block in the group having the most recent timestamp as compared to the other corresponding data blocks in the group; and
restore the recent data block having the most recent timestamp.

30. The method of claim 1, further comprising:
at a second computer remote from the first computer and the remote database storage device:
breaking down a second version of the specified data set to be backed up into a second plurality of data blocks comprising at least the selected data block;
generating for each of the second plurality of data blocks a corresponding data block digest and metadata; and
associating each data block digest and each metadata with the corresponding data block; and
comparing a second generated data block digest for the selected data block of the second version of the specified data set to be backed up with the first generated data block digest stored in the remote database storage device to determine whether the selected data block is already backed up;
upon determining that the second generated data block digest is not equal to the first generated data block digest stored in the remote database storage device, storing the selected data block, the associated second generated data block digest, and the associated metadata in the remote database storage device.

* * * * *